Dec. 21, 1926.
H. J. CREIGHTON
1,611,853
METHOD AND APPARATUS FOR COUNTERACTING SCALING AND CORROSION
Filed Oct. 4, 1924
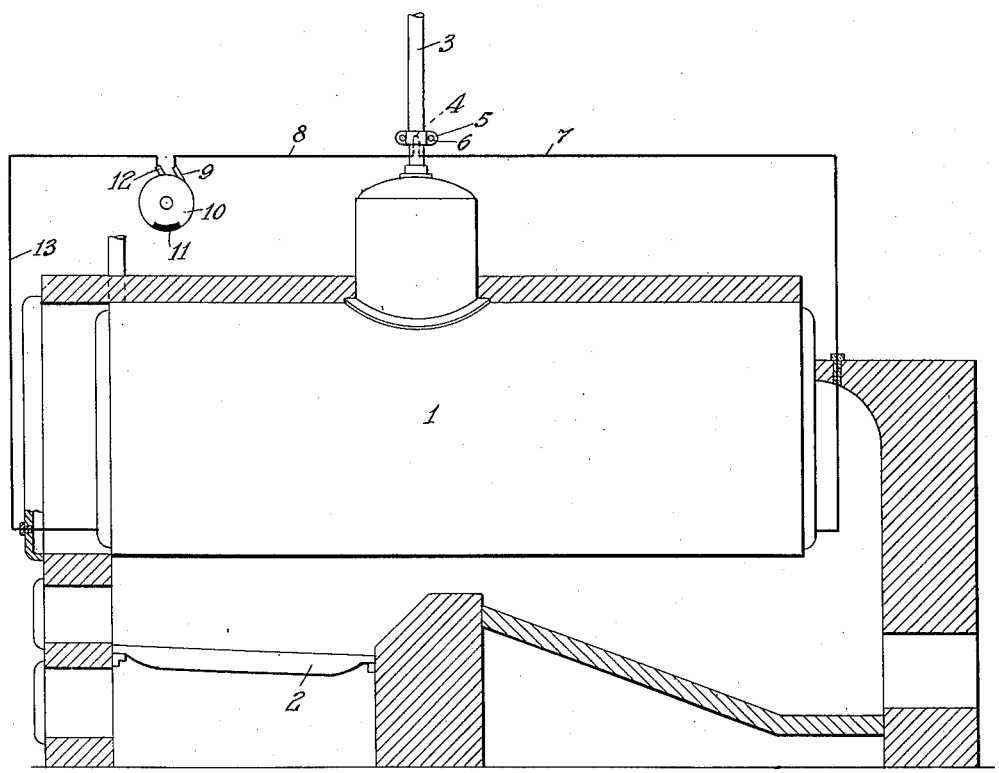
INVENTOR
Henry Jermain Creighton
BY
Kenyon & Kenyon
ATTORNEYS Patented Dec. 21, 1926.

1,611,853

UNITED STATES PATENT OFFICE.

HENRY JERMAIN CREIGHTON, OF SWARTHMORE, PENNSYLVANIA, ASSIGNOR TO ANTISCALE CORPORATION, OF PHILADELPHIA, PENNSYLVANIA, A CORPORATION OF DELAWARE.

METHOD AND APPARATUS FOR COUNTERACTING SCALING AND CORROSION.

Application filed October 4, 1924. Serial No. 741,751.

My invention relates to a method and apparatus for preventing or eliminating the scaling or encrusting and the electrolytic corrosion of metal in contact with fluid such as containers or conduits wherein fluid is being processed, a special and important embodiment and application of my invention being apparatus and a method whereby containers or conduits, such as boilers, evaporators, economizers, condensers, cold and hot water pipes and apparatus and the like are protected against the formation of scale from sediment or precipitates in the fluid therein contained and being processed against electrolytic corrosion.

When metal is in contact with a fluid as in the case where a fluid is being processed in a container or conduit, for example, when steam is being produced from water in a boiler, scale is produced on the surfaces of the container, particularly those in contact with the fluid, by reason of the presence of sediment or the production of precipitates in the fluid that is being processed, and if the container is made of metal electrolytic corrosion thereof takes place because of the impurities in the metal, differences of electrolytic solution pressure of various metals present and for other reasons, examples of electrolytic corrosion being the formation of rust upon boiler surfaces and the pitting thereof. The products of electrolytic corrosion may admix with precipitates or sediment in the fluid in the formation of scale or encrustation.

Electrolytic corrosion will occur when a fluid conduit or container is made of impure metal as is usually the case, or of different metals, as some parts of the surface of the container or conduit that are in contact with the fluid which is being processed therein will be electro-positive and other parts will be electro-negative. For example, in an iron or steel container having adjacent areas of pure and impure iron, the former will be electropositive with respect to the latter owing to the higher electrolytic solution pressure of pure iron and the lower electrolytic solution pressure of impure iron. It is between such dissimilar parts of the container that electrochemical action occurs. Owing to the higher electrolytic solution pressure, iron atoms in the electropositive area each leave two negative charges or electrons behind on the metal and enter the fluid as positively charged ferrous ions. As these free electrons accumulate, they spread over the surface of the electronegative area. Unless these electrons are consumed or removed they soon attain a "concentration" sufficiently high that the electrostatic attraction of the negative charges counter-balances the action of the electrolytic solution pressure of the iron, and so prevents further iron from entering the fluid as ferrous ions. If, however, the fluid being processed [e. g., water] contains positively charged hydrogen ions, these ions will be repelled from the electropositive area by the positively charged metallic ions entering into the fluid and will be attracted to the electronegative area where they will discharge and take up free electrons thereby permitting more metallic ions to enter the fluid at the electropositive area. The metallic ions take up hydroxyl ions from the fluid [e. g. water] and permit the further formation of hydrogen ions and the corrosion proceeds, the metallic [e. g. ferrous] hydroxide being oxidized and precipitated [e. g. as rust].

An object of my invention is to provide a process and apparatus whereby metallic fluid containers may be protected against corrosion and against the formation and adhesion of scale or encrustation therein without injuring the container itself, and whereby oxidized or corroded metal of the container may, at least in part, be reduced.

In accordance with my invention an electric current is passed through the conduit or container and the value of its voltage and the flow of that current are so selected and controlled that electrolytic corrosion is prevented or rendered harmless and existing products thereof are reduced, and furthermore the formation and adhesion of scale by reason of the presence of sediment or the formation of precipitates in the fluid or the occurrence of products of electrolytic corrosion, or by reason of any one or more of those causes, are prevented or overcome. In accordance with my invention the flow of current through the container is preferably effected by connecting the terminals of a source of current to the metal of the container so that the container forms a part of the electric circuit and current will flow through it without being directly introduced into, or directly conducted out of, the fluid that is being processed as in the case where an otherwise insulated electrode is immersed in that fluid and connected to a terminal of the source of current. And, the variation and control, to the end that the objects of my invention may be attained, of the current flowing through the metal of the container or conduit, preferably consists in an intermittent interruption of the flow in that metal of the current coming from the outside source.

For the purpose of fully disclosing my invention and assisting in the understanding thereof I shall describe its embodiment and application as employed in the protection of a steam boiler or other container or conduit in which water is being processed, for example, cooled or heated or evaporated or condensed, with the understanding, however, that my invention is not limited thereto but may be employed and embodied in devices used for the protection of any fluid container or conduit.

I have found that my invention provides complete protection for metallic surfaces in contact with fluid; and still referring to the use of my invention in connection with the protection of a steam boiler merely by way of illustration but without limiting myself thereto or being bound thereby, it is my belief that the prevention of corrosion and of the formation and adhesion of scale or encrustation in a steam boiler is effected, in accordance with my invention, by neutralization or reversal of ordinary electrolytic corrosion action and by the formation of gases whereby scale or encrustation is prevented from forming and adhering. It may be, however, that the elimination of the formation of oxide of the metal of the container or the reduction of oxide that has been formed prevents the formation and adhesion of the scale or encrustation. Moreover, it may be that variations in the flow of current or variations in the necessarily accompanying magnetic effects or variations of both current and magnetism act to prevent formation and adhesion of scale or encrustation or to prevent corrosion or to prevent both corrosion and encrustation and scaling.

Understanding that I am not limited to any theory of the operation of my invention that is herein set forth but desiring to make full disclosure of my invention it is my belief that the flow of current through a fluid container when properly controlled and regulated effects protection of the container as follows: The electrons from the negative pole of the source of electric current attract to metallic [electropositive] areas of that part of the surface of the container that is in contact with the fluid that is being processed therein, positively charged hydrogen ions of the fluid that is being processed, and those hydrogen ions take up electrons from such surface and are set free as hydrogen atoms. The consumption of electrons reduces the flow of electrons to the positive pole of the source and negatively charged hydroxyl ions from the fluid that is being processed are attracted to an electronegative area [e. g. iron oxide] and they discharge there and restore the flow of electrons. The discharged hydroxyl ions are incapable of separate existence and decompose to form water and gaseous oxygen. The oxygen, or some part of it, collecting between the container or conduit surface and any scale thereon will ultimately exert sufficient force to loosen the scale from the metallic surface. The hydrogen atoms produced when the hydrogen ions are discharged, are consumed by the oxide of the metal of the container that has been formed [e. g. iron oxide] and reduce products of corrosion thereof, or such hydrogen atoms prevent the formation of oxide of the metal of the container and therefore prevent corrosion of the container. The removal of the hydrogen from the liquid also prevents the accumulation of gaseous pressure and permits the above described electrolytic action to proceed at such voltages as may be employed without destructive action on the container. The removal of the hydrogen permits the continued separation in the fluid being processed of hydrogen ions and hydroxyl ions [e. g. dissociation of water] which might otherwise proceed to only a small extent. The foregoing process proceeds at the many places where a piece of scale and the metal of the container are adjacent and when all scale has been removed and there is no more metallic oxide to be reduced the flow of current prevents the formation of further metallic oxide [e. g. iron oxide] because it maintains a negative charge on the metal that counteracts the electrolytic solution pressure of the metal of the container [e. g. iron] and prevents metallic ions [e. g. ferrous ions necessary to the formation of rust] from entering the fluid.

The theory above set forth requires the presence of metallic oxide in order that the removal of scale by gas pressure may proceed and thus seems to explain my discovery above described that the flow of current through the container is advantageously intermittent or varied in order to secure the greatest protection of the container. Thus, in accordance with the theory above set forth interruption or variation of the flow of current through the container in accordance with my invention will permit the periodic formation of sufficient metallic oxide to cause the process to be effective to protect the container against continuous formation and accumulation of scale and encrustation of all kinds in addition to protecting it against corrosion. Continuous flows of current of proper strength and voltage will apparently protect the container against electrolytic corrosion but in order also to effect a continual removal and prevent the accumulation of scale and encrustation by reason of sediment or formation of precipitates in the fluid that is being processed it is necessary that the flow of current through the metal of the container or conduit shall be interrupted for intervals of uniform or variable duration or otherwise varied. One theory of such operation is, as above stated, that it is necessary that sufficient oxidation be permitted to provide for the electrolytic production of gases that will loosen or prevent the formation of scale or encrustation.

In accordance with my invention, therefore, I propose to establish a low potential difference between remote parts of a fluid container, for example, by connecting a thermocouple or other source of electric energy of commensurate current strength and voltage to opposite ends of a metallic body or conduit or container that is to be protected. The conductors of the circuit are connected to spaced points of the metal of the body or container or conduit and that metal thus becomes a part of the circuit between the terminals of the source of electric energy. Such a source of energy will, when controlled or varied as herein described, provide protection for the container or conduit while a source of energy of greater voltage, for example, a source of energy giving an appreciable current at more than 1.5 to 1.7 volts would cause a corrosion and pitting of the container or conduit. Thus, in accordance with my invention the current in the metallic body to be protected that is supplied from an outside source is interrupted or varied at intervals that may be of uniform or variable duration, for example, current from the outside source may be caused to flow only a part of the time, for instance, a quarter to three-quarters of the time. One theoretical explanation of the effect of such interruption or variation of the current is that while the current is not flowing, or is flowing at too low a rate to prevent corrosion, there is formation of oxide or other product of corrosion that, when current is again flowing with sufficient strength, is reduced with the consequent production of gas that loosens or breaks up or otherwise prevents formation or adhesion of scale or encrustation, but it is possible that the interruption or variation of the current or of the necessarily accompanying magnetic effects, or of both, effects the desired protection in a manner other than that set forth in the above tentative theory.

In the drawing accompanying this specification I have shown by way of example one embodiment of my invention in which a container such as the boiler 1 is mounted and supplied with heat from a fire on the grate 2. Steam is conducted from the boiler through the pipe 3 and the junction 4 of a thermocouple is held in close contact with the hot steam pipe 3 by means of a clamp 5 the parts of which are held together by bolts 6. One terminal of the thermocouple is connected by means of a wire 7 to one end of the boiler 1 and the other terminal of the thermocouple is connected by a wire 8 with the brush 9 that bears upon a commutator that has a conductive segment 10 and an insulated segment 11. A second brush 12 bears upon the commutator and a conductor 13 leads from the brush 12 to the other end of the boiler 1. The commutator may be rotated by any desired prime mover and current will flow through the circuit that includes the container except when one or both of the brushes 9 and 12 bear upon the insulated segment 11. The design, proportions and rate of rotation of the commutator may be varied to secure the desired control and variation of the flow of current through the container.

Although an important application and embodiment of my invention resides in the protection of a metallic container or conduit in which a liquid is being processed, against the formation of scale or incrustation and against electrolytic corrosion it is to be understood that my invention is adapted to the protection of metallic surfaces against encrustation or corrosion or against both encrustation and corrosion particularly of the surfaces thereof that are in contact with a fluid that is being either conducted or stored or processed, e. g. by cooling, heating, evaporation, condensation, etc. It is important in the operation of my invention that a metallic surface be in contact with a fluid and that the metallic body shall be connected at spaced points to the terminals of a source of electric current so that it forms a part of an electric circuit and that a current be passed through the metallic body at intervals of uniform or variable duration or otherwise varied and that the current so passed through the metallic body shall have a voltage below that which will cause electrolytic corrosion of the body, for example, a voltage and current strength comparable to the voltage and current strength produced by a thermocouple.

While I have described my invention and particularly one embodiment thereof in great detail and have set forth what may possibly be the theory of the operation of my invention I do not intend that my invention shall be limited to such details or to such theory but intend that it shall be defined by the hereunto appended claims.

What I claim and desire to secure by Letters Patent is:

1. The method of protecting metallic surfaces in contact with a body of fluid against formation and adhesion of scale thereon which comprises including the metallic surface in a metallic electric circuit, causing electric current to flow in said circuit so formed while maintaining across that part of said metallic surface that is included in said circuit a voltage below that which will cause appreciable electrolytic corrosion of the metallic surface beyond what would normally occur in the absence of said voltage, and intermittently interrupting said current flow, thereby preventing the formation and adhesion of scale on said surface.

2. The method of protecting metallic surfaces in contact with a body fluid against formation and adhesion of scale thereon, which comprises intermittently passing an electric current through the metallic surface without directly introducing the same into or withdrawing it from the fluid and thereby protecting said surface against formation and adhesion of scale while the voltage of said current is maintained below that which will cause appreciable electrolytic corrosion of the metallic surface beyond what would normally occur in the absence of said current.

3. In combination with a metallic container or conduit adapted for the processing of fluid, an eletrothermocouple having one of its terminals connected to said conduit or container and the other of its terminals connected through an interrupter to said container or conduit, said connections to the container being at remotely spaced points thereof and of such character and so adjusted as to protect said container or conduit against formation or adhesion of scale while producing between said points of connection a voltage below that which will cause appreciable electrolytic corrosion of said container or conduit beyond what would occur in the absence of said current.

4. In combination with a metallic container or conduit adapted for the processing of fluid, a source of electric current having its terminals respectively connected to said container or conduit at remotely spaced points thereof and capable of producing in the circuit so formed a current having a voltage and amperage of such value as to prevent formation of scale on said container or conduit without appreciably accelerating the electrolytic corrosion thereof, and means in the electric circuit for intermittently interrupting the flow of current.

In testimony whereof, I have signed my name to this specification.

HENRY JERMAIN CREIGHTON.